(12) United States Patent
Champagne

(10) Patent No.: US 7,036,841 B2
(45) Date of Patent: May 2, 2006

(54) LOCKING SAFETY DEVICE FOR TRACTOR HITCH

(76) Inventor: Marcel Champagne, 430, rang Saint Mathieu, St-Bernard QC (CA) G0S 2G0

( * ) Notice: Subject to any disclaimer, the term of this patent is extended or adjusted under 35 U.S.C. 154(b) by 0 days.

(21) Appl. No.: 10/916,588

(22) Filed: Aug. 12, 2004

(65) Prior Publication Data

US 2005/0140116 A1    Jun. 30, 2005

(51) Int. Cl.
*B60D 1/60* (2006.01)

(52) U.S. Cl. ............... 280/507; 280/506; 280/515

(58) Field of Classification Search ............... 280/507, 280/506, 515

See application file for complete search history.

(56) References Cited

U.S. PATENT DOCUMENTS 5,427,399 A * 6/1995 Olson ................. 280/515

* cited by examiner

*Primary Examiner*—Lesley D. Morris
*Assistant Examiner*—Marlon Arce-Diaz

(57) ABSTRACT

A safety device (20) for maintaining in place a pin (30) retaining a double hand attach (22) of a trailer hitch to a tractor or truck tow bar (24). The device prevents the release of the pin during the transport of the trailer by having a superior plate (34) above the pin limiting the vertical movement of the pin avoiding the popping out. The attaching and the detaching of the device is done because the superior plate may pivot when the pin is released and is maintained in place by a latch (36) that has a counterweight (38). The latch is then rocked and kept closed with the action of gravity. The device comprises also fitting screws (52, 74) allowing to adapt the safety device to several sizes and thicknesses of the different tow bars used on tractors and trucks nowadays so that the device fits any trailer of a farmer yard.

14 Claims, 15 Drawing Sheets

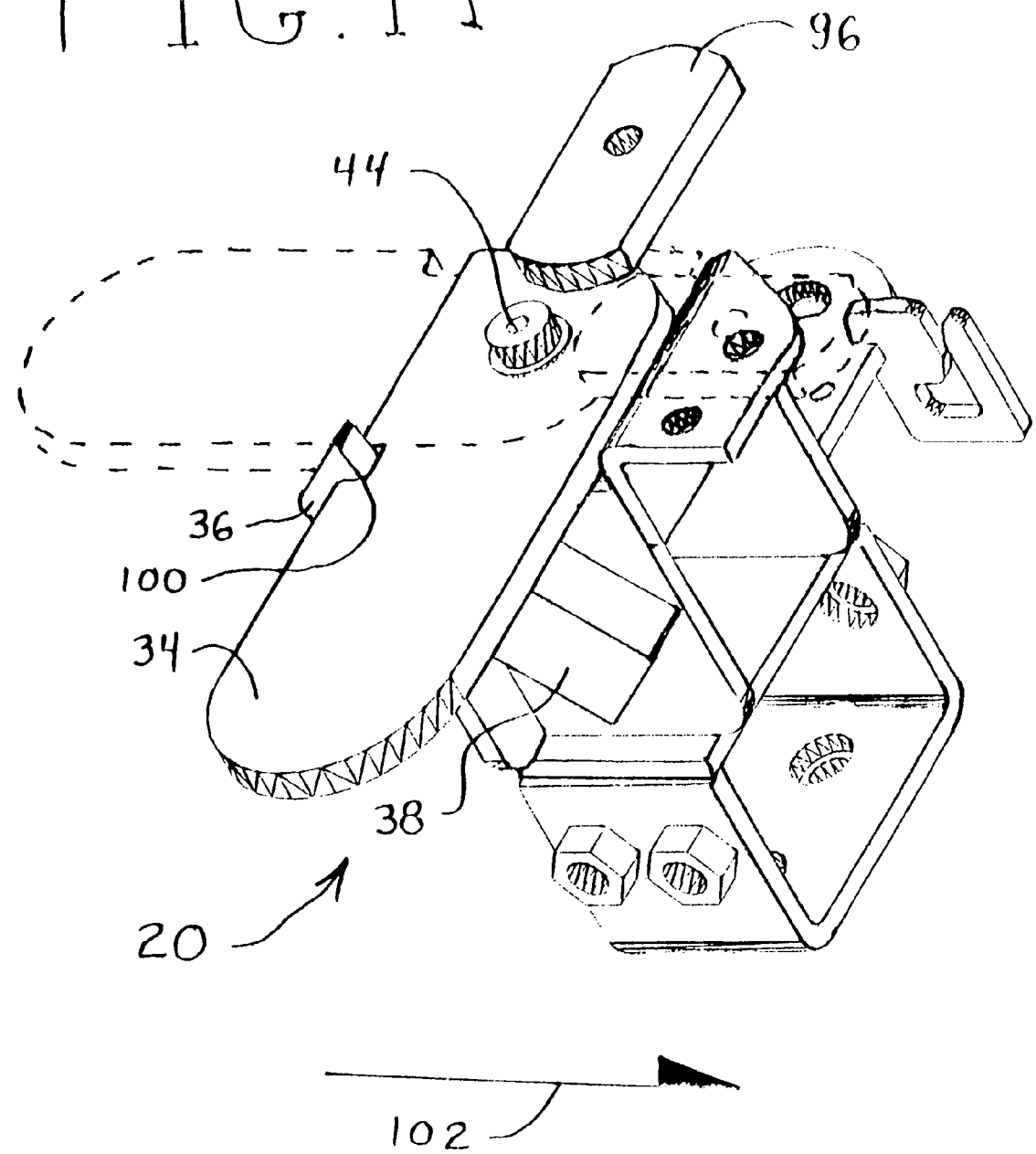

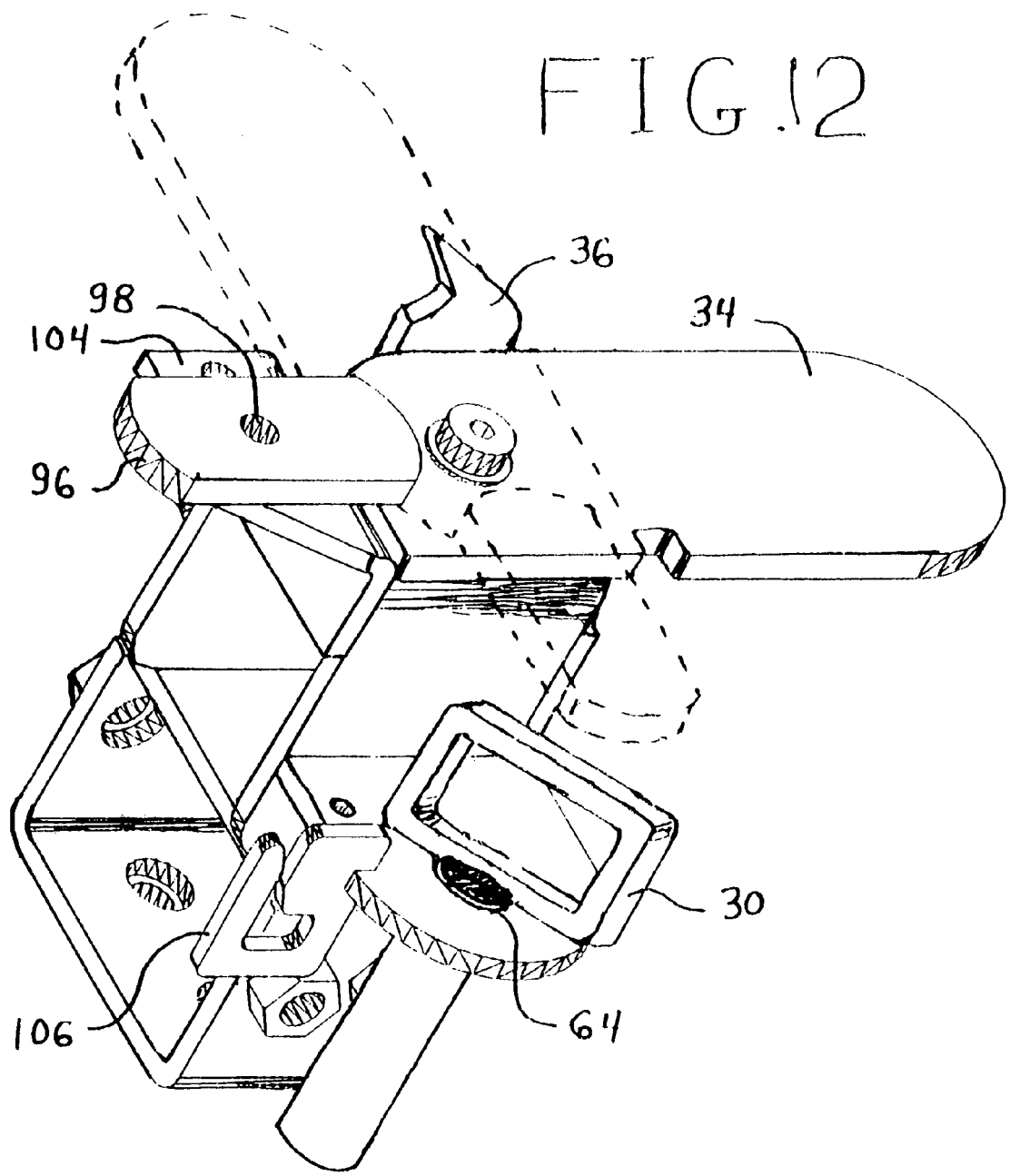

LOCKING SAFETY DEVICE FOR TRACTOR HITCH

CROSS-REFERENCE

"Not Applicable"

STATEMENT REGARDING FEDERALLY SPONSORED RESEARCH

"Not Applicable"

NAMES OF THE PARTIES TO A JOINT RESEARCH AGREEMENT "Not Applicable"

REFERENCE TO A "SEQUENCE LISTING"

"Not Applicable"

BACKGROUND OF THE INVENTION

It is a general objective of the invention to provide a safety device meant to prevent the accidental release of trailers towed by vehicles particularly farm tractors, a device installed on a straight part of a trailer tow bar. This device having a plate set precisely above a pinhead to avoid the release. The inventor wanted this attach to be adaptable to several tow bars particularly the ones utilized in combination with agricultural tractors and that the installation of the device be done only once on a tractor and that it would suit the majority of the trailers utilized.

Furthermore, the inventor wanted that the attach could be adapted easily to different sizes of tractor tow bars. This attach should be simple, affordable and durable and meet the higher standards of safety. Certain tow bars have a Z shape with a short straight part. It is a more limited objective to provide a handle installed on this straight part and comprising a superior plate on which pivots the plate to cover the pin, the handle side comprising rocking means to lock in place the plate when it covers the pin. The trailers utilized have a double hand attach through which passes the pin.

More specifically, the objective of this invention is to provide an eccentric locking latch comprising a limiting extension and a rocking part which when rocked causes the limiting extension to retain the plate in place. This latch prevents the releasing from its position of the superior plate during transport of a trailer.

A great advantage of the invention is its adaptability of installation to a great deal of tractors, especially that it does not necessitate movements along the tow bar nor vertical movement and that it comprises fitting screws. Furthermore, the way the device is conceived, one can unlock it with one hand only letting the other hand free. The device does not depend on a spring, increasing its durability and its liability, for springs are often quite breakable and not always as resistant. The superior plate can retain a great force.

1. Field of the Invention

This invention relates to the field of the safety in the attachment of trailers towed by vehicles, especially to secure a pin used to maintain a trailer towed by farm tractors or trucks, preventing the accidental release of the pin and diminishing this potential source of hazards.

2. Description of Prior Art

Certain types and techniques of construction of safety locks are utilized to secure a pin to retain a tractor or truck tow bar between double hand plates. Generally, what is commonly used nowadays is a safety pin <<Cotter Pin>> located at the base of a maintaining pin, the safety pin passing through a hole drilled in the pin. However, one embodiment utilizes a device 20 placed above a superior hand 26 of a double hand attach 22, the device comprises a safety plate 34 held by spring means above the maintaining pin 30. A shortcoming that we observe in the prior art is that there is no simple and independent devices or methods to permit to maintain a pin in place while there is a great force coming from the bottom when it travels in a rugged terrain or when tractors get stuck. The known spring type pin attachments have a great tendency to exit when bottom forces are practiced.

The following patents and patent application Publications illustrate such concepts.

CA 992791, shows a mechanism installed on a double hand of a trailer, made of a rectangular plate 22 rotating around a pivot to avoid the releasing of a pin during vibrations caused by the transport.

The plate is held in place by a spring and has a thickness 24 corresponding to the thickness of a head 20 of its pin. One has to apply a manual force to lift the plate in order to turn it.

U.S. Pat. No. 4,783,094, Shows a system installed on a straight bar of a certain type of tractors; a plate avoids the vertical movement of a pin 20. This system comprises a locking rod sustained by a spring. This rod restrains the movement of the system on the tow bar by penetrating a hole located in the tow bar. Because the holes are not always at the same distance one has to drill new holes at times. One has also to lift the rod to slide the system backward on a tow bar that fits.

U.S. Pat. No. 6,193,260: a device installed on a double hand of a trailer adapted to a maintaining pin meant to prevent the accidental loss of the pin and the trailer.

FR 2458410: a case including a lock held by a chain.

BRIEF SUMMARY OF THE INVENTION

It is a safety device for attachment to a vehicle, for example a farm tractor, provided with a tow bar generally rectangular. This tow bar must be attached to a trailer comprising in the front a pair of hands. Regularly, it is a pair of plate that exceed at the front. The hands that are attached to a tow bar are secured by a vertical retention component 30, which generally takes the shape of a vertical pin for a safety device meant for joining a trailer to a vehicle.

BRIEF DESCRIPTION OF THE SEVERAL VIEWS OF THE DRAWINGS

The drawings illustrate an embodiment of the invention.

FIG. 11 is a top view, opened, with double lock

FIG. 12 is a top view, closed, with double lock

DETAILED DESCRIPTION OF THE INVENTION

Figure 1:
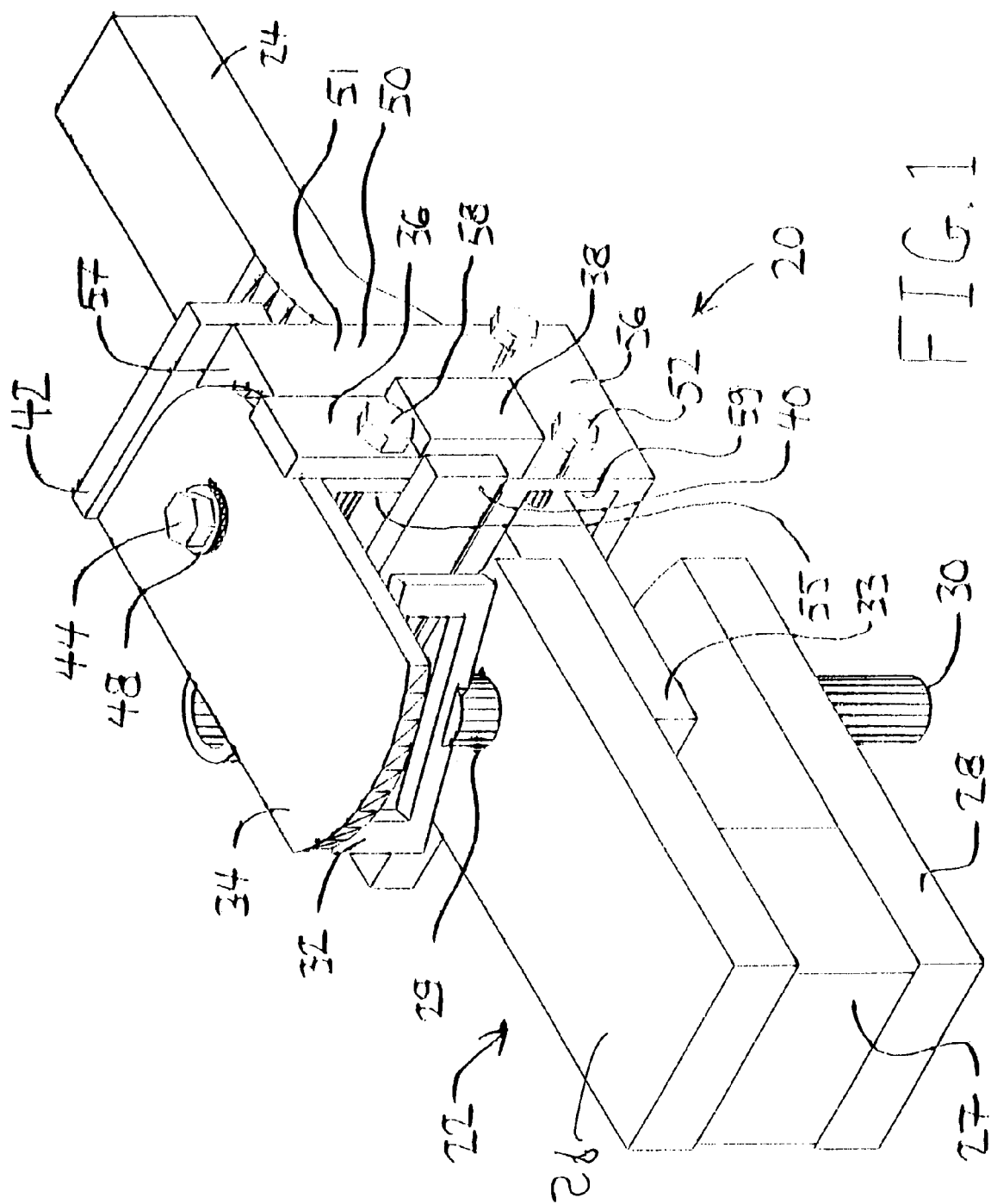
FIG. 1 is a perspective, seen from the front, in a locked position.

In the following descriptions the bold numbers refer to items illustrated in the drawings. By definition the front of a device is when looking at a tow bar at the back of a tractor.

FIG. 1 shows a safety device 20 on a tow bar 24 of a tractor. One sees a double hand 22 of a trailer comprising a superior hand 26, a junction piece 27 and an inferior hand 28. The hands have an aperture 29 that receives a pin 30 that has a handle 32. The pin passes as well through a straight end 33 of the tow bar. The tow bar has also an aperture, not seen on this figure and the pin crosses the three apertures. A superior plate 34 is located just above the handle to avoid the release of the pin vertically from its position. A latch 36 is maintained against a front maintaining plate 40 by the effect of a counterweight 38, holding the superior plate in place in an anti-clockwise rotation. The superior plate is also retained in a clockwise rotation by a rear stopping plate 42. A superior bolt 44 coupled to a superior ring 48 permits the pivoting of the superior plate. The body of the device comprises a socket 50 having a vertical face 51 against which is mounted a latch 36 and where fitting screws 52 appear. It is constituted of two sections: a locking superior section 55 and a tightening inferior section 56 of the straight end of the tow bar. The socket has also a horizontal face 57 on which can pivot the superior plate 34. The latch 36 revolves around a horizontal pivot which is perceive as a horizontal pivot head 58. One sees also an inferior passage 59, the straight end of the tow bar 24 passes in a tightening chamber 56. The tractor tow bar 24 is inserted in the inferior passage and is maintained in position by the fitting screws 52.

Figure 2:
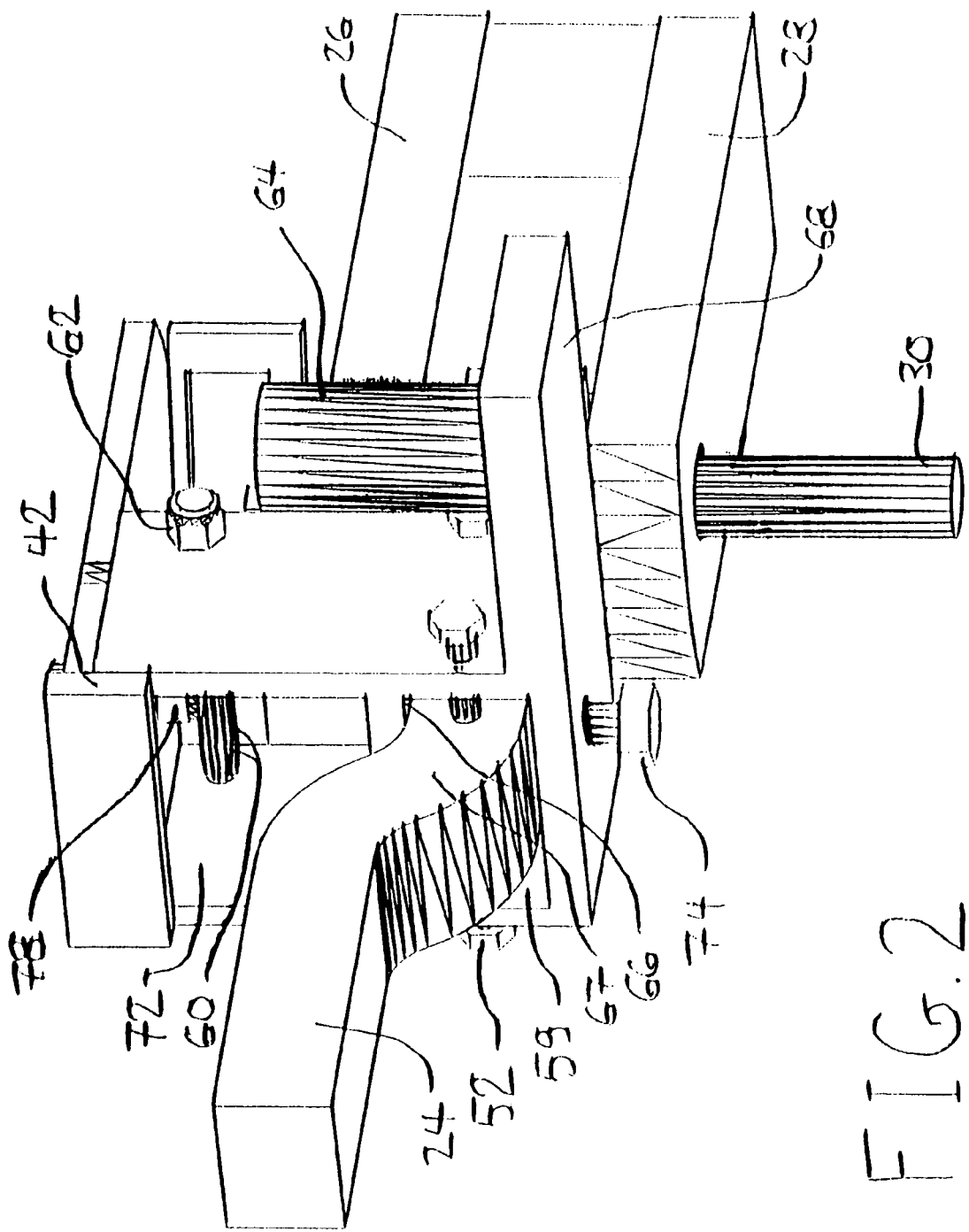
FIG. 2 is a perspective of the device of FIG. 1 seen from the back.

In the shown position, the latch restrains the rotation of the plate and confines it to its locked position. The latch must be pivoted on the axis of the horizontal pivot to an angle of ninety degrees (90 degree.) and be placed in its open position before the plate could be turned to a ninety degree angle (90 degree.) to be in its open position as well. The dimensions of the conception permit to proceed to the opening operation with only one hand. FIG. 2 shows the device of FIG. 1 seen from the back, the bottom and the right. One sees the two hands 28, 26 of the attach of the double hand trailer and the inferior part of the maintaining pin 30. One remarks a horizontal pivot 60 ended by a pivot nut 62. One sees a receiving place 64 meant to receive the pin 30 when it is not utilized. One remarks also a side surface 66 meant to receive the tow bar 24 often provided with a curve in Z 67. A extension plate 68 comes to receive the receiving place 64. This view permits to demonstrate the two passages of the principal body, the socket 50; the inferior passage 59, and the superior passage 72. The tow bar is leaned to the side surface 66 and is maintained in this position by a vertical adjustment screw 74. One sees clearly the rear stopping plate 42, and underneath it, one sees the horizontal pivot 60 maintained in places by the pivot nut 62. One sees also a nut, the vertical nut 78, which retains the superior bolt.

Figure 3:
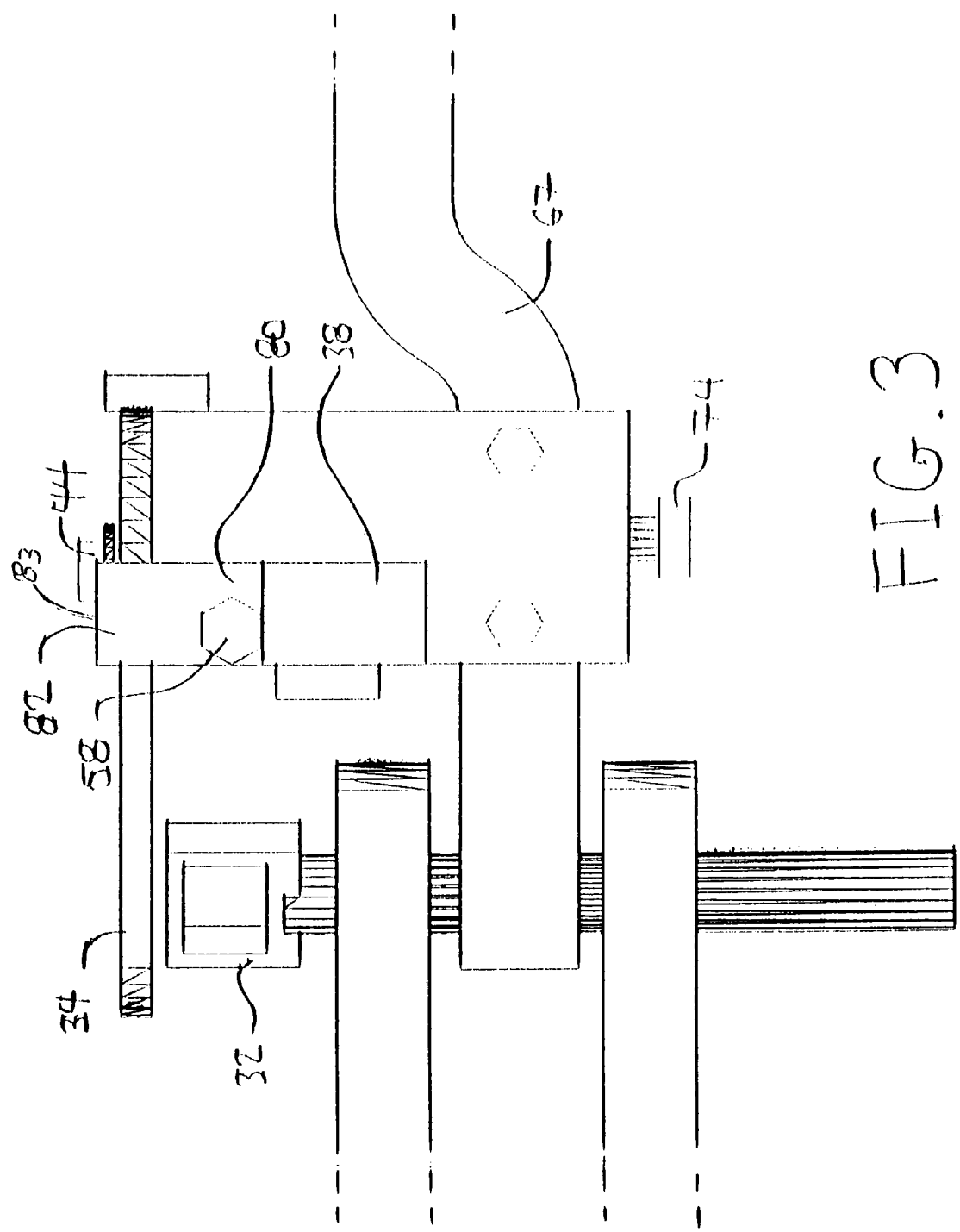
FIG. 3 is a side view, locked position.

FIG. 3 shows the size view in closed position. The latch is in closed position. One remarks an eccentric 80 in order that the horizontal pivot be placed to the left of the counterweight vertical centre 38. In this configuration, the horizontal nut head 58 is maintained leaning against the counterweight 38 in order to turn automatically with it. To retain the latch shut more efficiently, a spring can be inserted inside the device. Added to the effect of the counterweight, this spring will provide an additional withholding means and even if this spring is broken, the gravity will keep on activating the latch.

Figure 4:
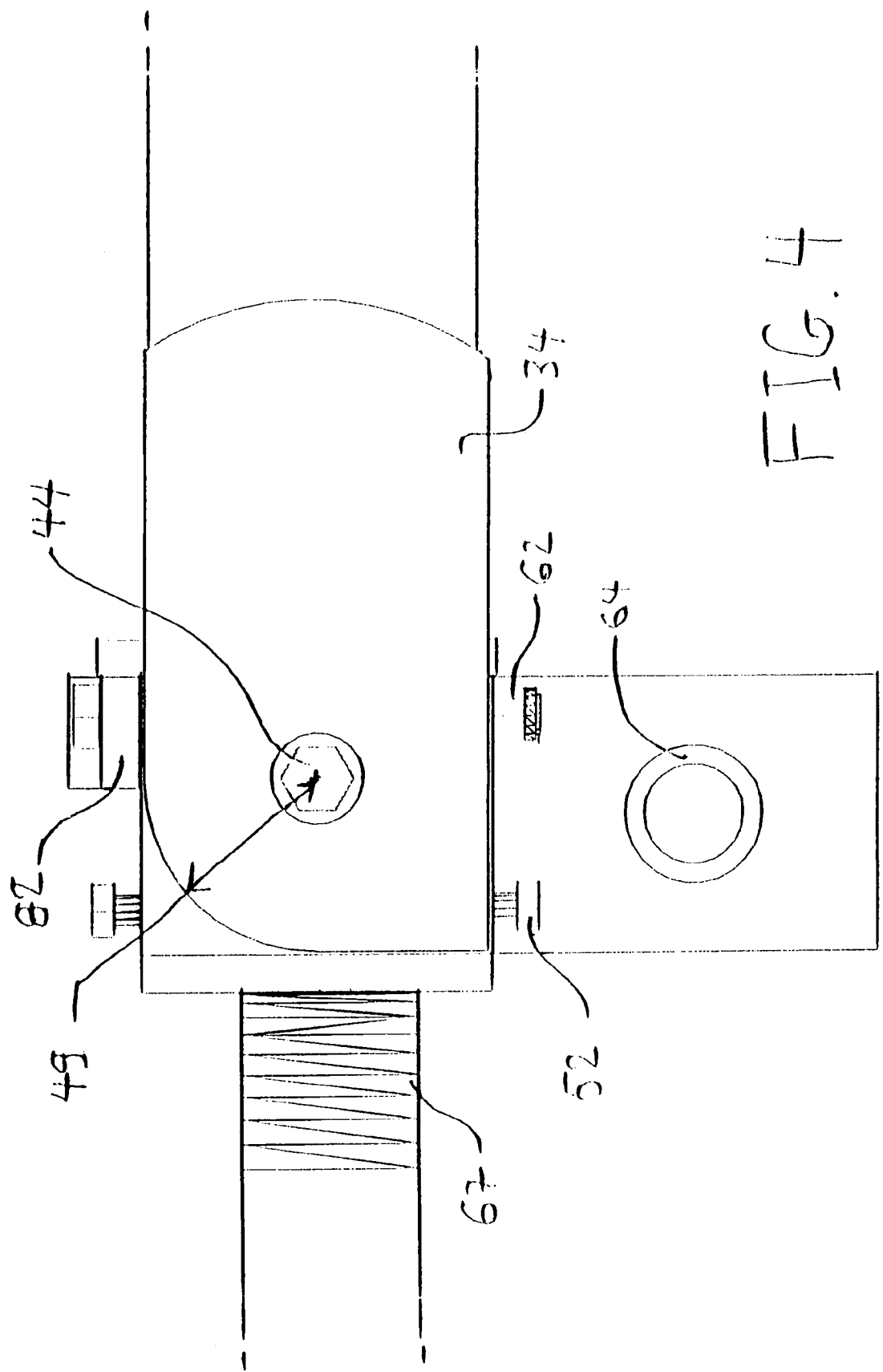
FIG. 4 is a top view, locked position.

FIG. 4 shows a view in a closed position. The plate 34 is also in closed position. On the upper plate is mounted a plate 34 to turn around the superior pivot 49 permitting to turn the plate only in the anti-clockwise direction. On the side plate, towards the top, near the cover plate there is an excess 82 coming from the latch 36.

Figure 5:
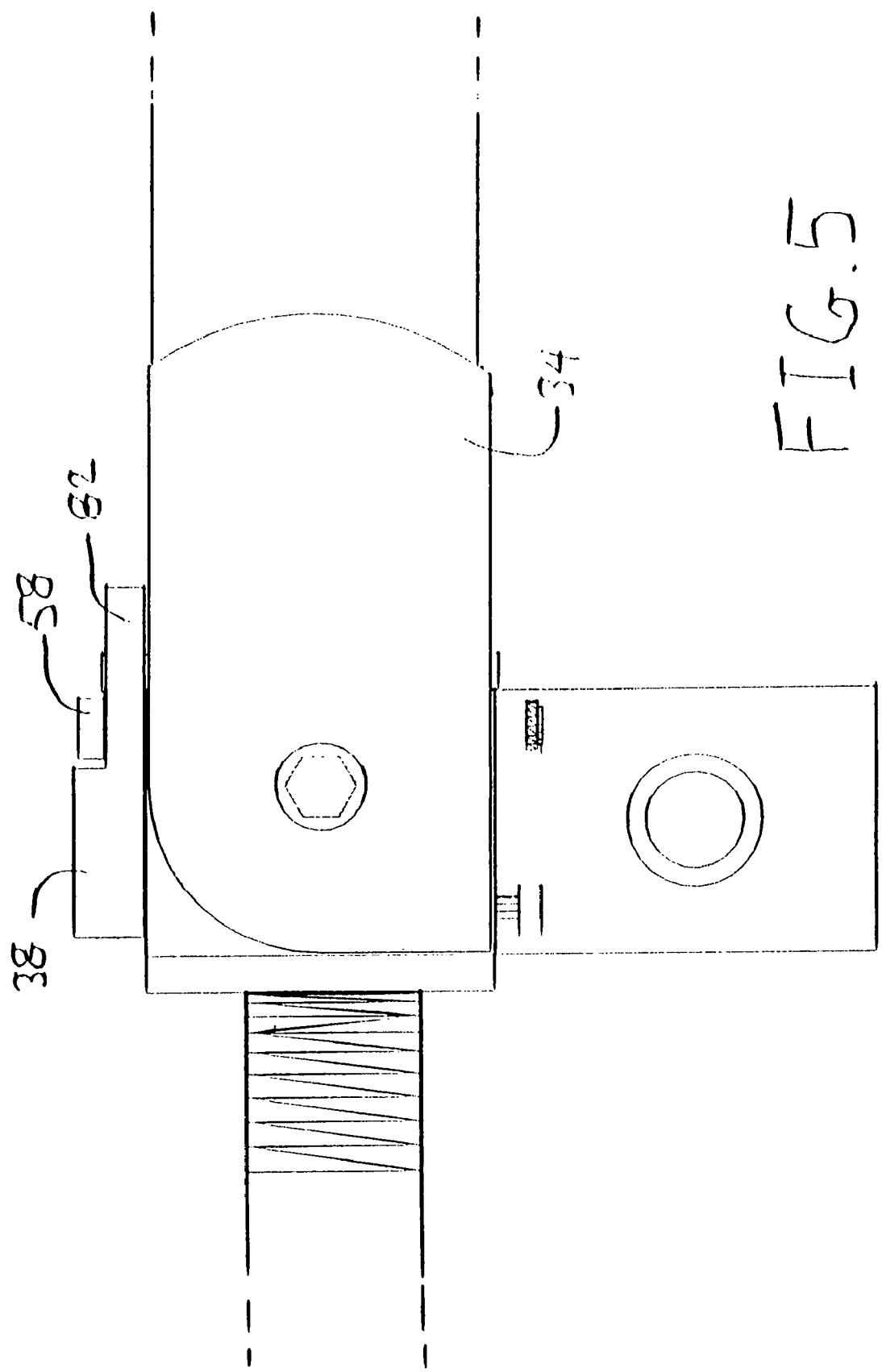
FIG. 5 is a top view, changing position.

FIG. 5 shows a top view of the latch turned around the horizontal pivot in its open position, the counterweight 38 is maintained elevated against the action of gravity. The plate 34 is then free to move onto the top of the latch.

Figure 6:
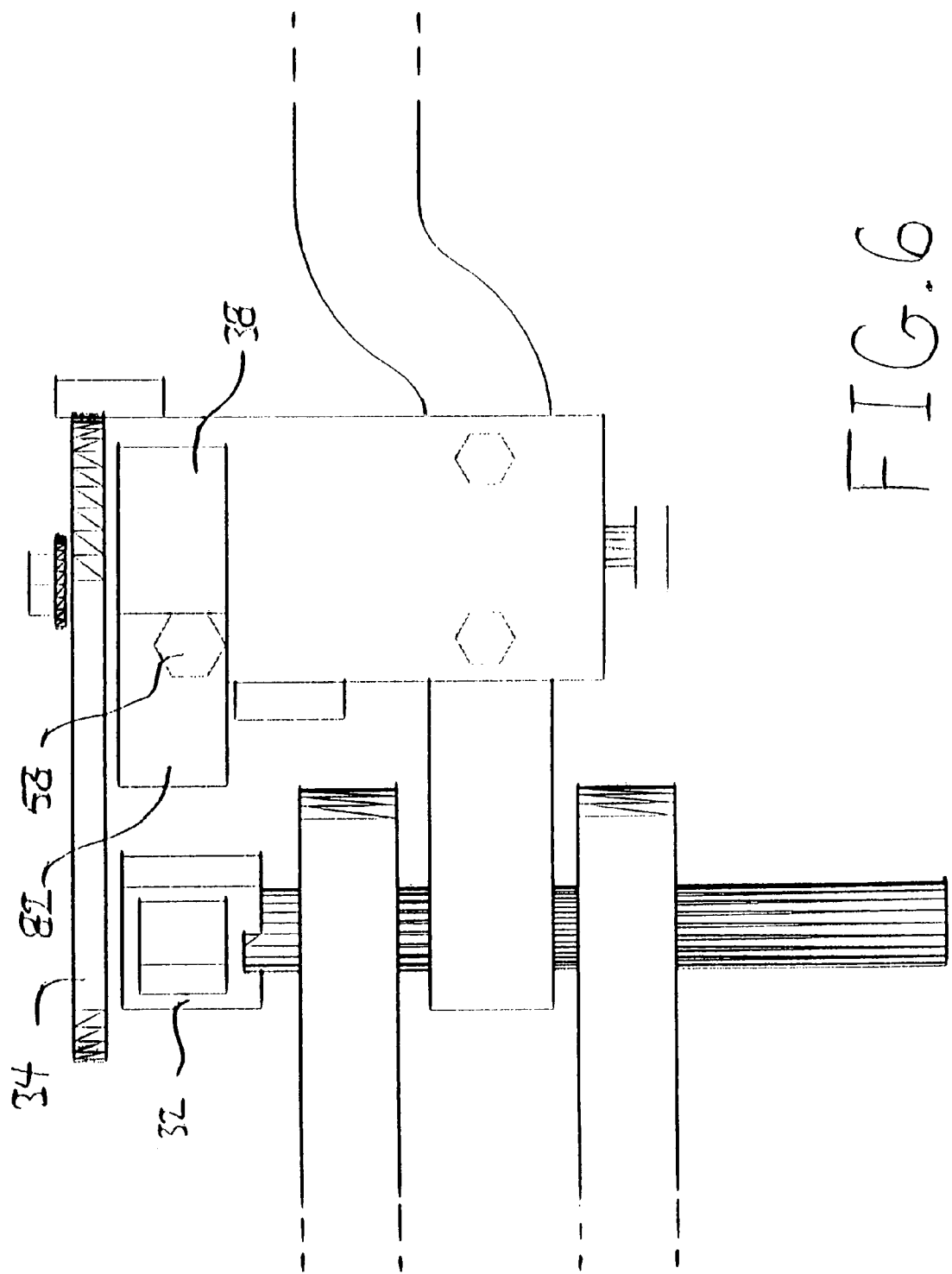
FIG. 6 is a side view, changing position.

FIG. 6 shows in side view the FIG. 5. One sees how the latch is pivoted around the horizontal pivot 58.

Figure 7:
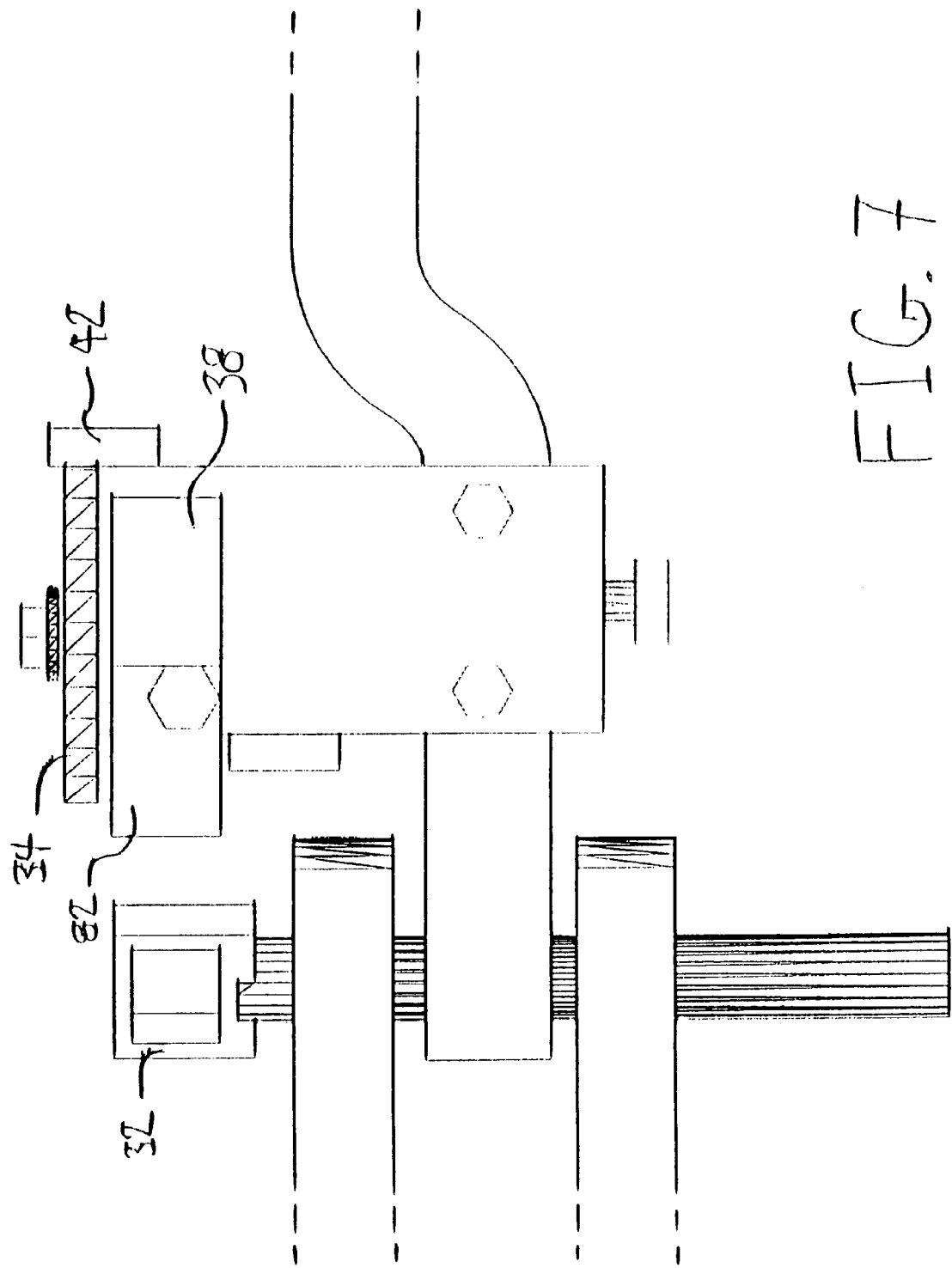
FIG. 7 is a side view, open position.

FIG. 7 shows in side view the latch in open position wherein the plate 34 is also pivoted in open position.

Figure 8:
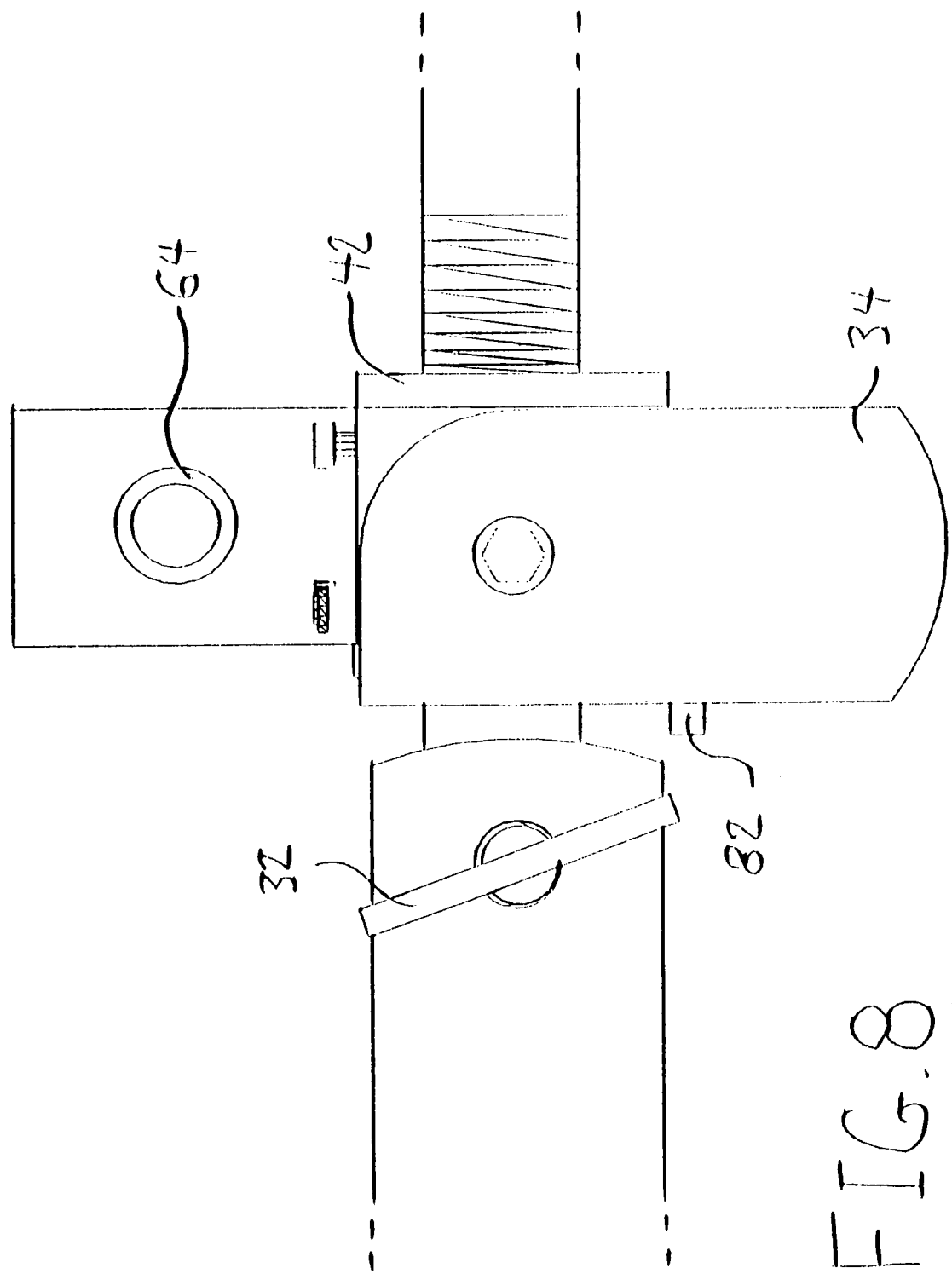
FIG. 8 is a top view, open position.

FIG. 8 shows in bottom view the superior plate 34 pivoted in its open position.

Figure 9:
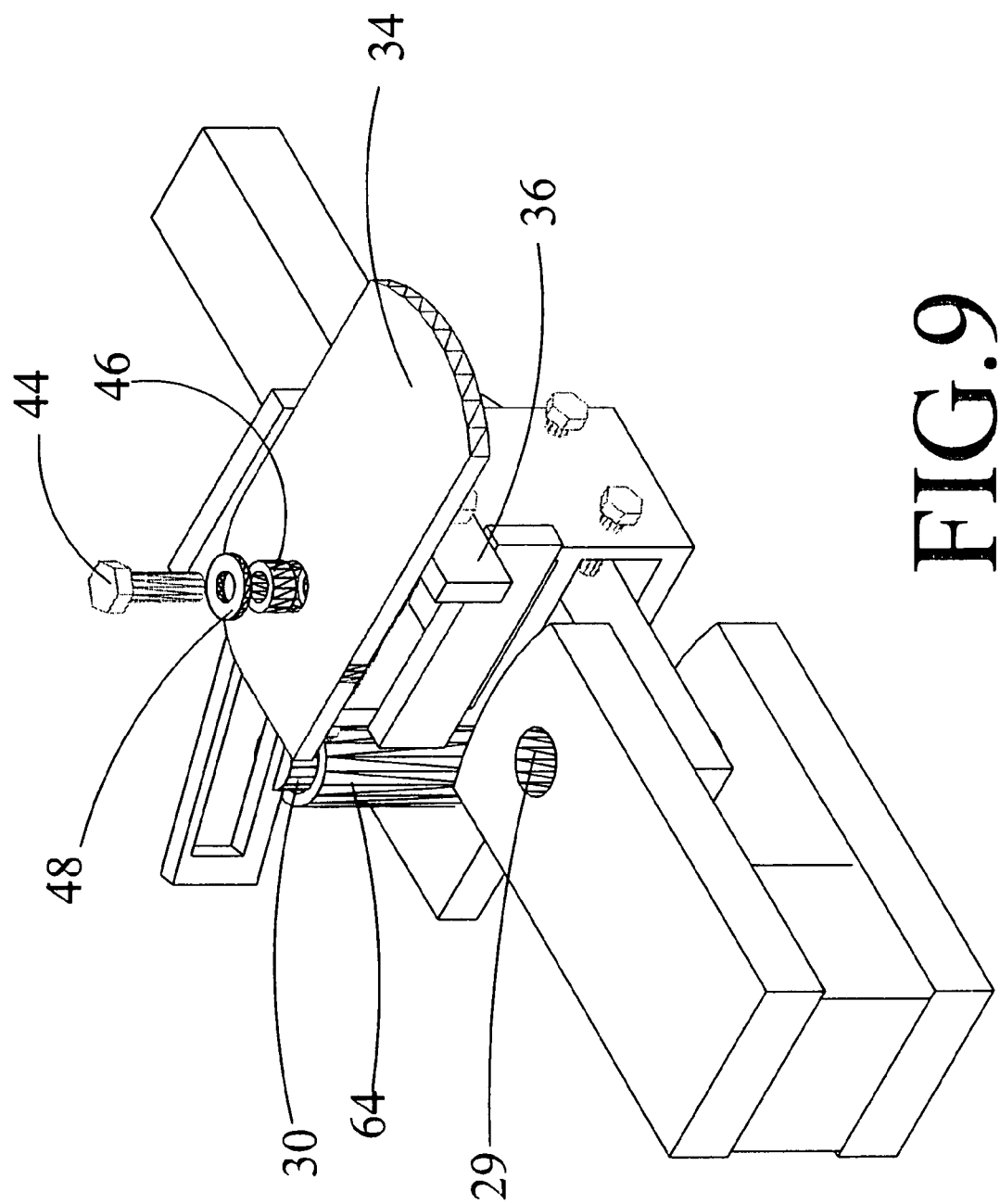
FIG. 9 is a perspective view of the device showing a superior assembly.

FIG. 9 shows a perspective of the safety device completely open: the pin 30 is inserted in its receiving place 68. Of course, a chain can be fixed to this pin in order to maintain it attached to the body of the safety device. On this figure, one sees clearly the aperture 29 in the superior hand. The assembly of the superior vertical pivot is shown in detail. It consists of a vertical bolt 44, leaning on a ring 48 that is supported on a spacing collar 46. The collar is of a height slightly more elevated than the thickness of the superior plate in order to permit the entrance of a nut, not shown, to tighten efficiently the assembly and so that the plate could keep on turning. One seeks to tighten firmly this nut so it will not get loose in the long run, absorbing the vibrations and the wear resulting from coming along with frequent and intensive utilization.

Figure 10A:
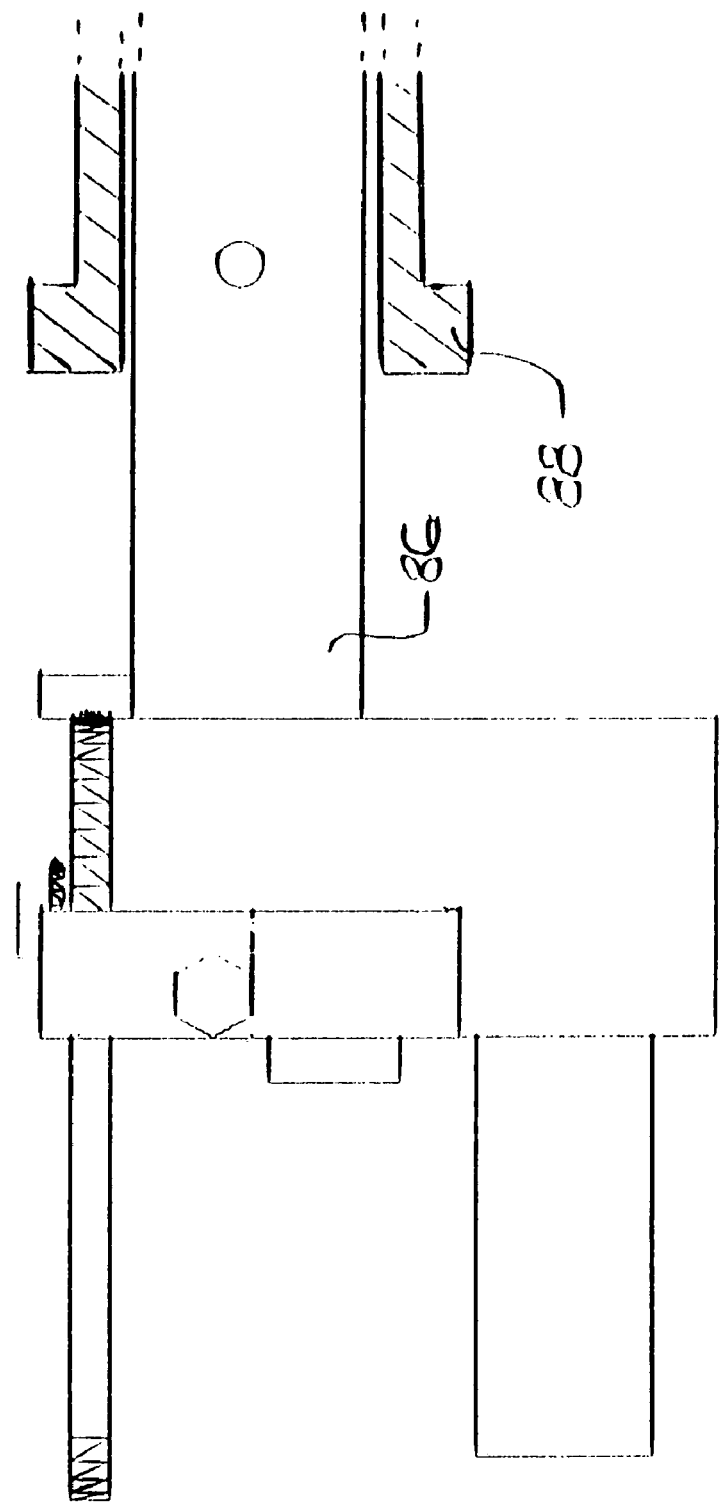
FIG. 10A is a side view for truck use.

FIG. 10A shows another embodiment of the invention: the utilization for a truck. In this case, the receiving case 88 of a truck receives an attachment bar 86 that takes part in the device.

Figure 10B:
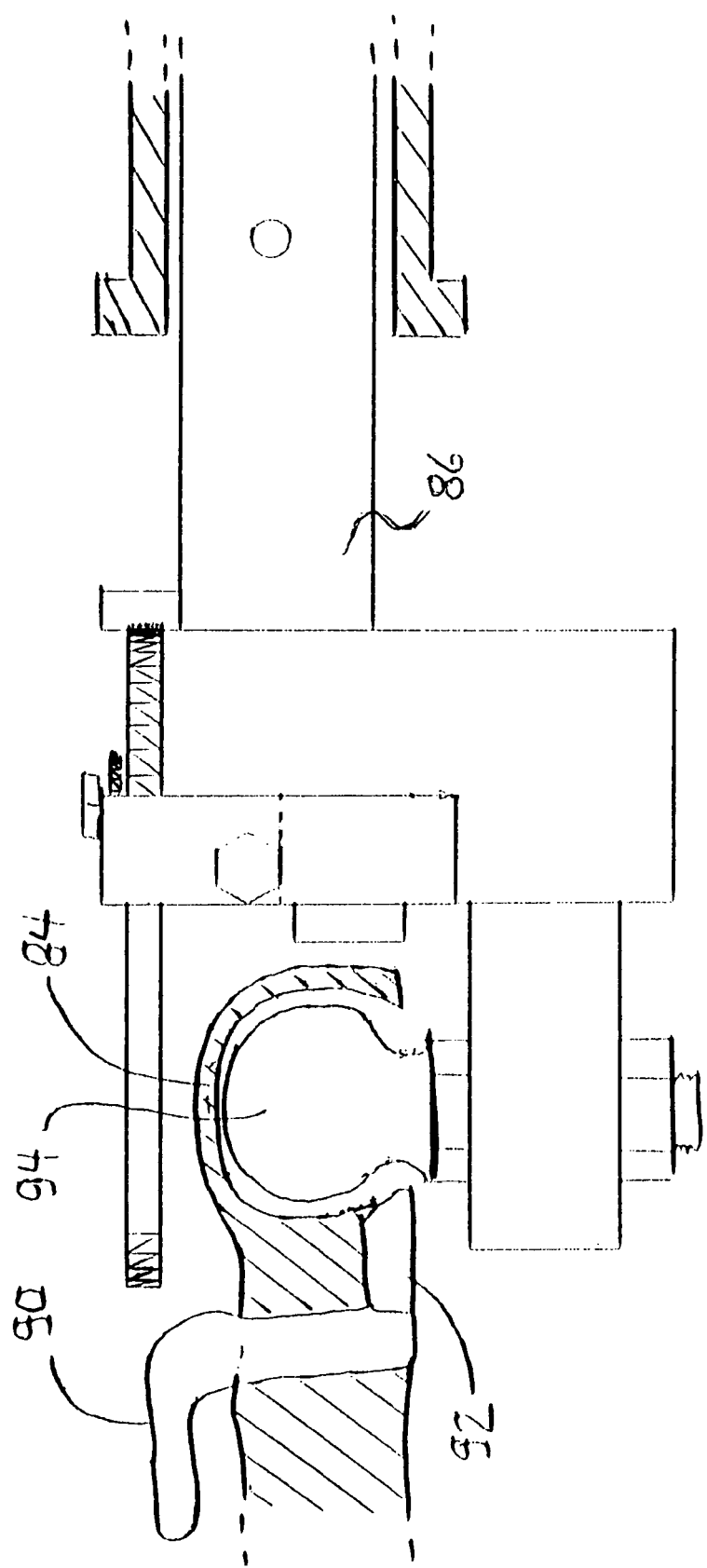
FIG. 10B if a view of FIG. 10A with a ball included.

FIG. 10B shows the device of FIG. 10A wherein a hitch ball 94 of truck to is be installed. One sees as well how the attach of the trailer 84 covets the hitch ball. Generally, this type of truck attach is provided with a handle 90 activating a support point 92.

Figure 10C:
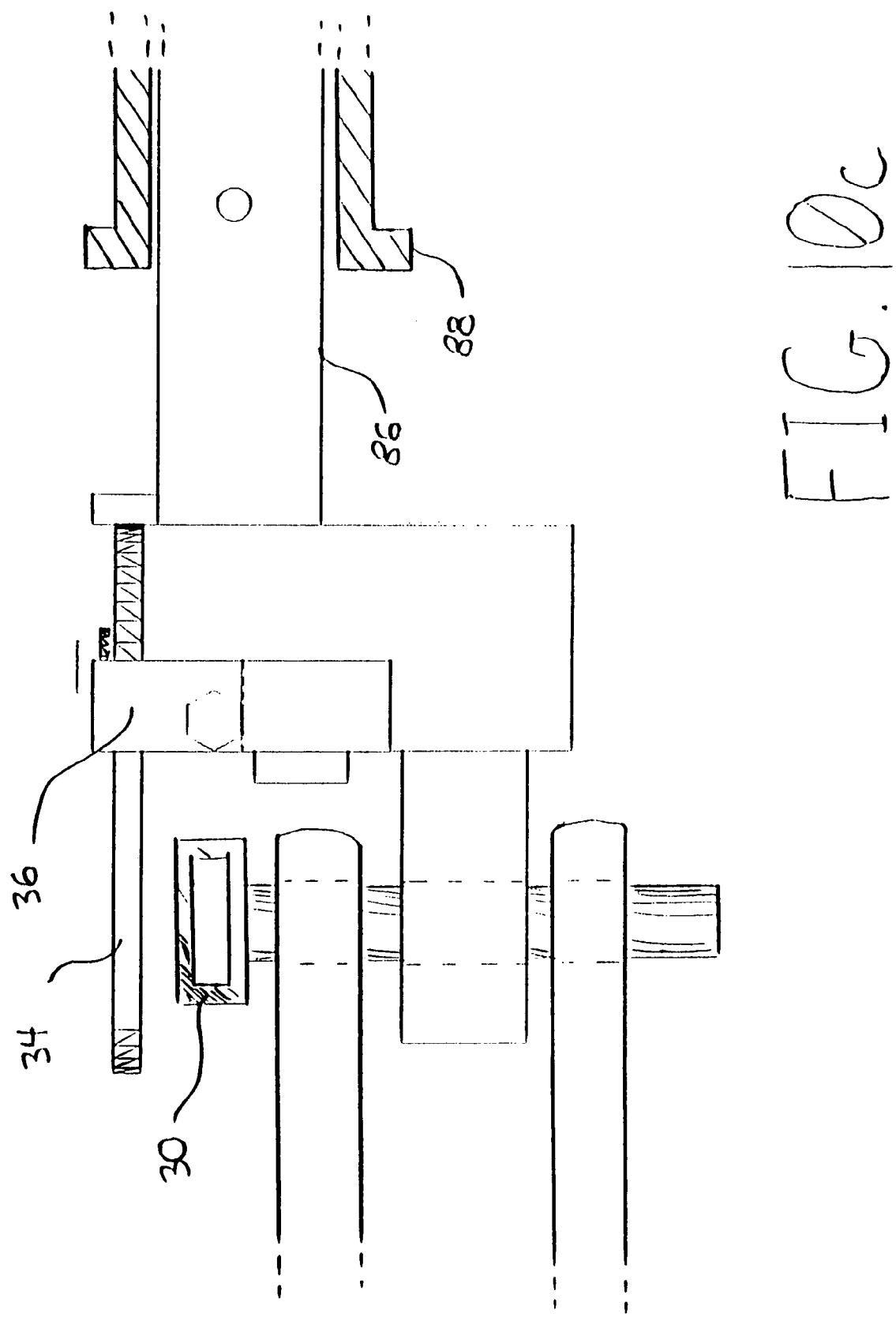
FIG. 10C is a view of FIG. 10A with double hand and pin.

FIG. 10C shows the device of FIG. 10A wherein there is no hitch ball although the truck can pull a double handed attach trailer, as tractor trailers.

FIG. 11 illustrates a safe lock to tie to a tractor 20. One sees a latch 36 which is pivoted into a cavity 100 of a superior plate 34. The superior plate is shown in an <<opened>> position, that is a position in which one may remove a maintaining pin (not shown) which must retain a tractor arm to a double arm of a trailer. One may see an extension 96, which is added at the back of the main plate 34.

FIG. 12 shows the barrier in operating position wherein the plate 34 is held in place by the latch 36 which is now in a completely vertical position. It is maintained so thanks to the action of gravity caused by the counterweight 38. In use, this position corresponds to that of a pin 30 underneath the plate 34. The extension 96 offers the possibility of locking by means of lock hole 98 coinciding with another hole, not seen, in bend 104, which permits the insertion of a lock or a <<pin>>.

Figure 13:
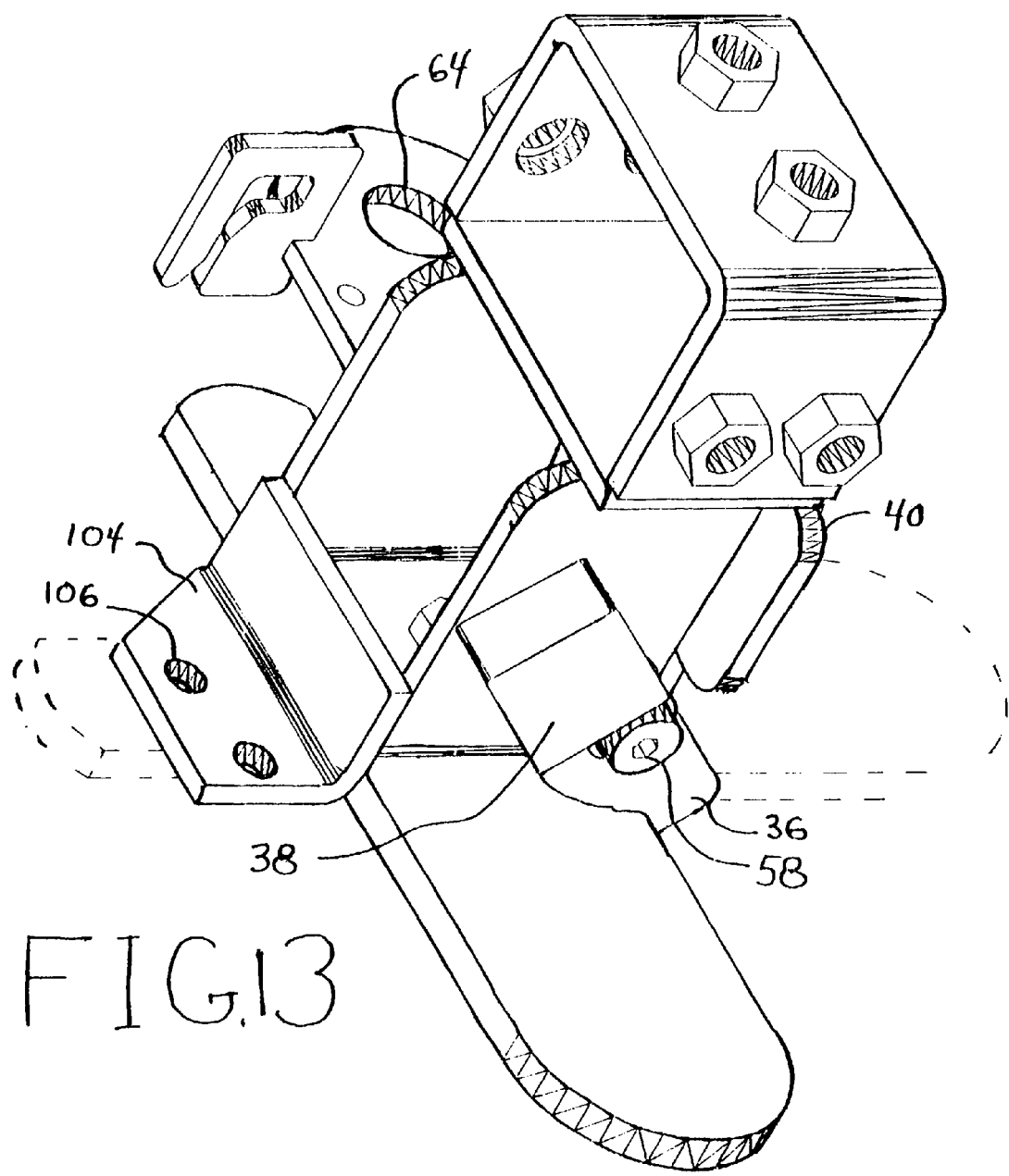
FIG. 13 is a bottom view, opened, with double lock.

The pin 30 is illustrated in FIG. 12 in a storage 64. Generally, once the pin is positioned in the receiving place 64, one pivots the plate 34 into the <<open>> position. In the closed position the pin is prevented from exiting while the tractor is in motion. FIG. 13 is seen from underneath in position <<opened>>. One sees the safety plaque 104 as well as the safety hole 106. One sees the latch pivoting about an axis represented by a horizontal pivot head 58. A stopper plate 40 permits limiting the pivoting of the latch more than 90 degrees. The dimensions of the structure permit operating the openings from a single hand.

Ramifications

In use, the attach is tremendously reliable and easy to operate. The installation is done directly on the tractor; incidentally, there is no need to drill holes neither in the tow bar nor in the double hand.

The device comprises:
- a principal body 50 that can be a simple or a double sleeve comprising a superior face 57 and a lateral face 51,
- a means to install to the tow bar, that can be centering screws, an eccentric that would be safe and secure,
- a superior plate 34 disposed on the superior face that could pivot around an axis 44 and comprising means to retain vertically in place the retention component 30 acting in the maintaining in place of the trailer behind the vehicle.
- a pendular latch 36 disposed on the lateral face side, pivoting around an axis 58 and comprising a counterweight 38 retained towards the bottom under the action of gravity and comprising an elongated side 82 with an excess 83 preventing the plate from turning while the elongated side is positioned towards the top.

The device comprises also a stopping plate bar 42 preventing the turning of the plate when passed at an open position restraining the rotation of the plate to a 90-degree angle.

The device comprises also a latch stopping bar 40 restraining the rotation of the latch to a 90.degree angle.

The means to install to a vehicle tow bar comprise fitting screws 52, 74, to the horizontal and to the vertical, permitting to adapt to different sizes of rectangular tow bars.

The device installed on a tractor tow bar and the retention component consists in a pin 30.

The device installed on a hitch ball of a truck and the retention components consist in a metal part recovering the hitch ball of the truck. In this particular case, the hand will be modified to adapt to the level difference: in an L section the horizontal part becomes the tow bar. The horizontal plate 34 is fixed on an extension of the trailer hitch.

The device comprises as well a pin seat 64 wherein the pin can be tightened in between uses. The device comprises also a chain related to the pin of the device.

It is accepted that the realization mode of the present invention that was described above, in reference to the drawings annexed, was given as indicative but certainly not limitative, and that modifications and adaptations could be brought without moving aside the object of the frame of the present invention.

| LEGEND | |
|---|---|
| 20 | Safety device |
| 22 | Double hand attach |
| 24 | Tow bar |
| 26 | Superior hand |
| 27 | Junction piece |
| 28 | Inferior hand |
| 29 | Aperture |
| 30 | Maintaining pin |
| 31 | Retaining pin |
| 32 | Pin handle |
| 33 | Straight end |
| 34 | Safety_plate |
| 36 | Pendular latch |
| 38 | Counterweight |
| 40 | Front stopping plate |
| 42 | Rear stopping plate |
| 44 | Superior axis |
| 46 | Spacing collar |
| 48 | Superior ring |
| 49 | Radius |
| 50 | Principal body |
| 51 | Lateral face |
| 52 | Horizontal fitting screws |
| 55 | Locking place |
| 56 | Tightening chamber |
| 57 | Superior face |
| 58 | Horizontal pivot head |
| 59 | Inferior passage |
| 60 | Horizontal pivot |
| 62 | Pivot Nut |
| 64 | Receiving place |
| 66 | Support |
| 67 | Z turn |
| 68 | Extension plate |
| 72 | Superior passage |
| 74 | Vertical fitting screws |
| 78 | Vertical Nut |
| 80 | Eccentric |
| 82 | Overhang component |
| 83 | Excess component |
| 84 | Trailer attach |
| 86 | Truck bar |
| 88 | Truck attach |
| 90 | Handle |
| 92 | Support point |
| 94 | Truck ball |
| 96 | Extension |
| 98 | Lock hole |
| 100 | Cavity |
| 102 | Direction |
| 104 | Bend |
| 106 | Cotter pin hang |

I claim:

1. A locking safety device to maintain in place a trailer attached to a vehicle by an attaching combination comprising a vertical retention component (30), said locking safety device comprising:
    a principal body (50) comprising a superior face (57) and a lateral face (51),
    a superior plate (34) pivotally mounted on said superior face and maintaining vertically in place said vertical retention component (30) when placed above it, this position defined as <<closed position>>,
    a pendular latch (36) pivotally placed on said lateral face, for moving around a horizontal pivot head (58), said pendular latch provided with a counterweight (38) at one end and an overhang component (82) at its other end, said counterweight causing under the action of gravity said overhang component (82) to exceed said superior face and prevent the pivoting of said superior plate out of said closed position.

2. The locking safety device of claim 1 for attachment to a vehicle (20) wherein said superior face (57) is provided with a rear stopping plate (42) that prevents the pivoting of said plate away from said closed position thereby causing locking in two directions.

3. The locking safety device of claim 2 wherein said latch is in locked position when said overhang component is oriented towards the top and wherein said latch is in unlock position when said overhang component is pivoted out of said position, said device comprising also a front stopping plate (40) restraining the pivoting of said latch to 90+−10 degrees.

4. A locking safety device to maintain a vehicle attached to a double hand attach (22) of an existing trailer, a vertical retention component being provided therefor, said device comprising:
 a principal body (50) having a superior face (57) and a lateral face (51),
 a superior plate (34) pivotally mounted on said superior face and maintaining vertically in place said vertical retention component (30) when placed above it, this position defined as <<closed position>>,
 a pendular latch (36) pivotally placed on said lateral face, for moving around a horizontal pivot head (58), said pendular latch provided with a counterweight (38) at one end and an overhang component (82) at its other end, said counterweight causing under the action of gravity said overhang component (82) to exceed said superior face and prevent the pivoting of said superior plate out of said closed position,
said vehicle being a tractor equipped with a tow bar conceived in rectangular sections, means of installation therefor comprising a rectangular aperture located at the inferior side of said principal body, and fitting screws (52, 74), said-double hand attach (22) entering said rectangular aperture and held in place by the tightening of said fitting screws, to adapt the device to different sizes of rectangular tow bars.

5. The locking safety device so defined by claim 4 wherein said tow bar and said double hand attach (22) comprise each a hole crossing them vertically and wherein said vertical retention component consists in a pin (30) of a shape generally cylindrical and elongated provided with a head sliding vertically in said holes to retain arms horizontally.

6. The locking safety device of claim 1 comprising a principal body (50) which comprises a superior face (57) and a lateral face (51) of a superior sleeve defining a locking place (55) and means of installation to said tow bar comprising an inferior sleeve attached to said superior sleeve and defining a tightening place (56), said means of installation comprise also fitting screws fixed through the side of said tightening place (56), and meant to attach said traction arm into said locking place (55).

7. The locking safety device defined in claim 1 fixed on an attach of reception of a hitch ball of a truck and wherein said vertical retention component consists in an attach covering a hitch ball of a truck.

8. The locking safety device of claim 5 comprising more than one receiving place (64) wherein the pin can be stored in between utilizations.

9. The locking safety device of claim 5 comprising also a chain retaining said vertical retention component to said device.

10. A locking safety device for a vertical retention component, a tow bar, an attaching arm of a tow bar of a trailer to be towed by a vehicle and comprising: a principal body (50) comprising a superior face (57) and a lateral face (51), means to install to said tow bar, a superior plate (34) disposed on said superior face which can pivot between an opened position and a closed position on said superior face around a plate axis (44), said superior plate comprising an overhang component of the principal body, said closed position being obtained when said overhang component restrains vertically the movement of said vertical retention component (30), said opened position being obtained when said plate does not restrain the vertical movement of said vertical retention component, a pendular latch (36) disposed on and pivoting on said lateral face, pivoting around a latch axis (58) said latch being provided with a counterweight (38) retained towards the bottom under the action of gravity, and comprising an elongated side (82) to the other end preventing said plate to pivot when oriented towards the top.

11. The locking safety device of claim 10 comprising also a rear stopping plate (42) preventing the turning of said plate from its open position to the opposite direction of said latch restraining the rotation of said plate to 90 degrees in the other direction.

12. The locking safety device of claim 10 wherein installation means to the tow bar at a vehicle comprise fitting screws (52, 74), permitting to adapt the device to different sizes of rectangular tow bars.

13. The locking safety device of claim 10 installed on a tractor tow bar and wherein said retention component consists in a pin (30).

14. The locking safety device defined by claim 10 wherein installation means permit to fix the device on a truck hitch ball and wherein said retention component consists in a metal part recovering said truck hitch ball.

* * * * *